Nov. 1, 1927.
K. STOLL ET AL
1,647,756
METHOD OF SHAPING PLASTIC MATERIAL
Filed Feb. 28, 1927     4 Sheets-Sheet 1
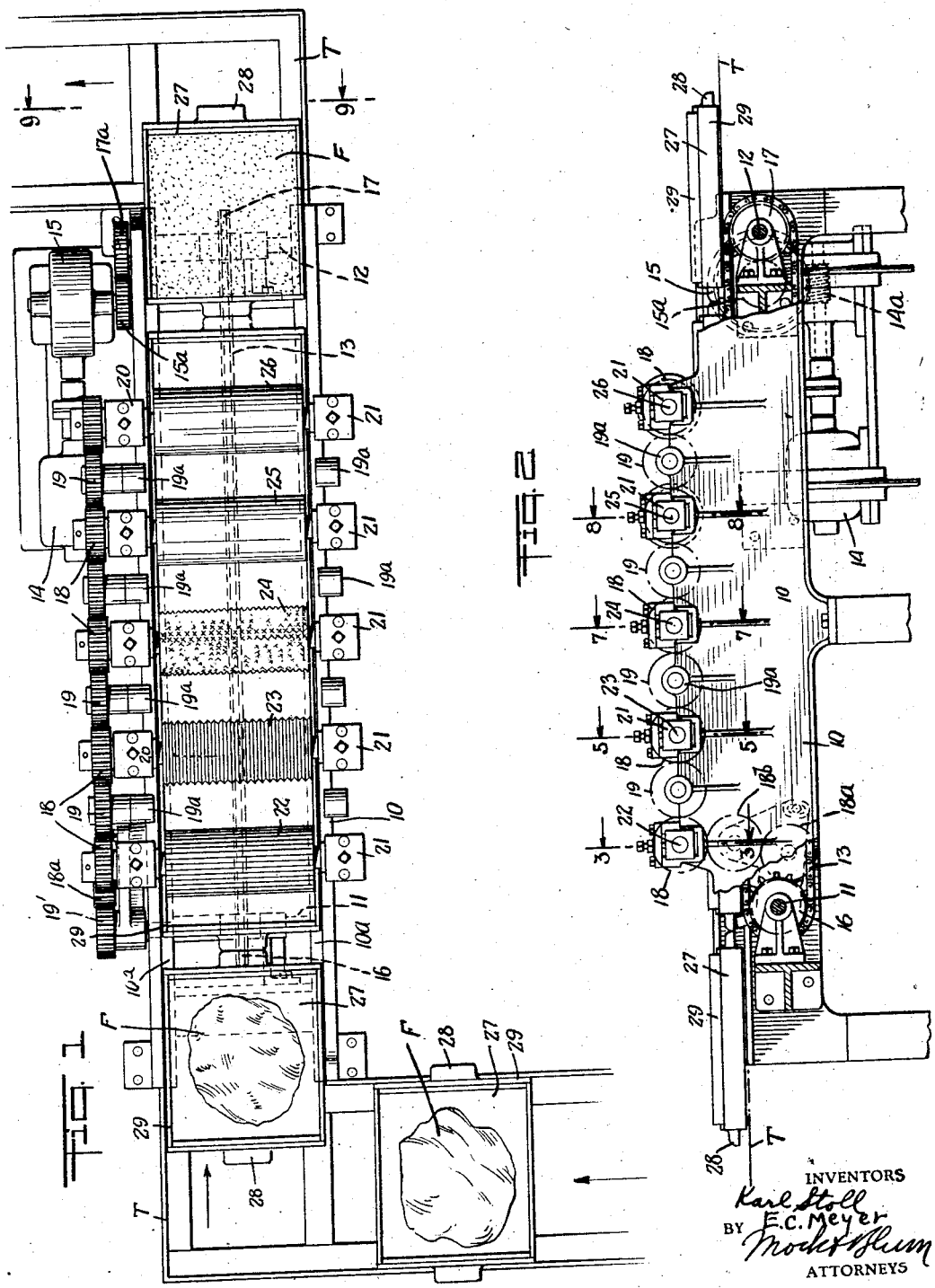
INVENTORS
Karl Stoll
E. C. Meyer
BY
ATTORNEYS

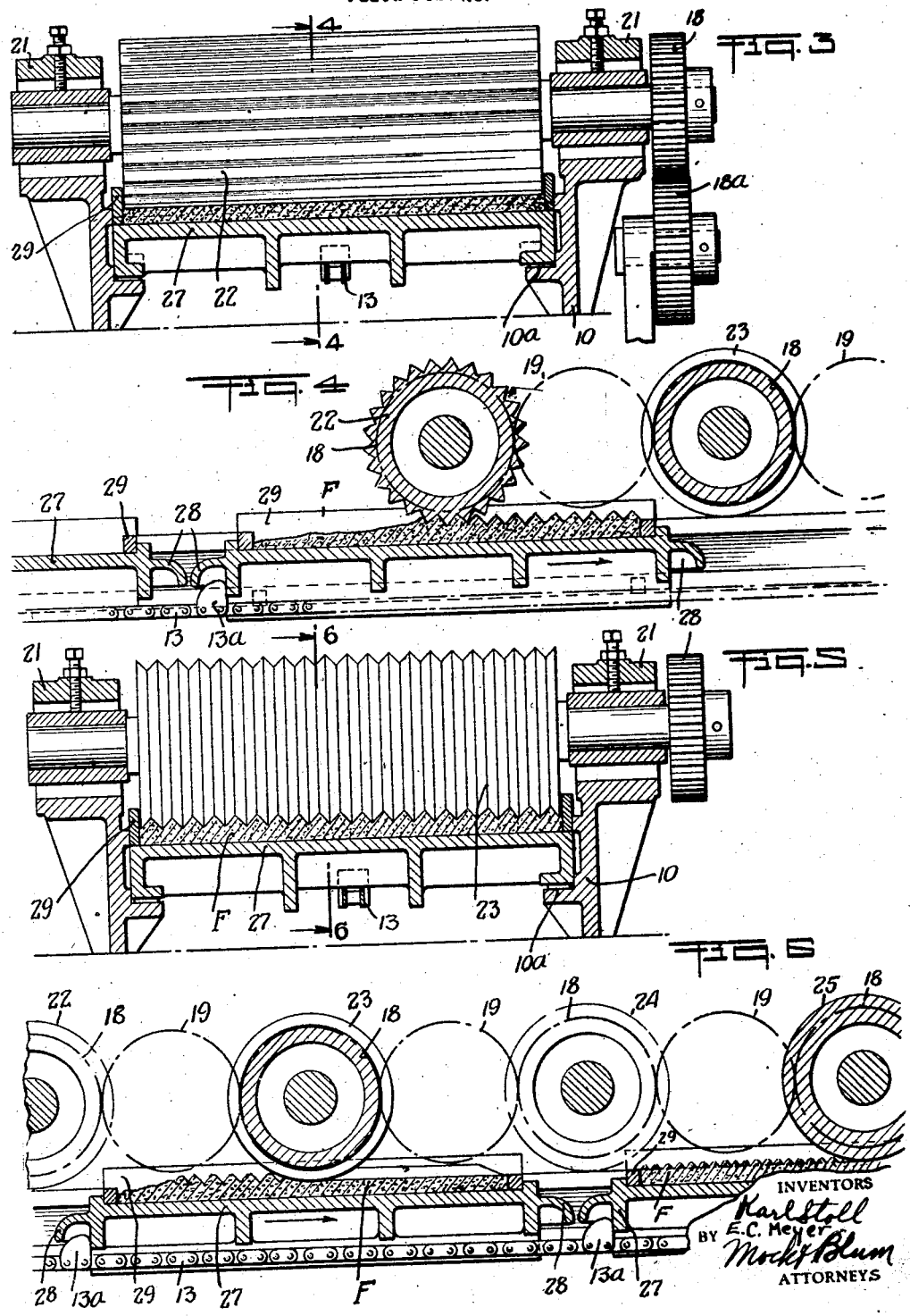

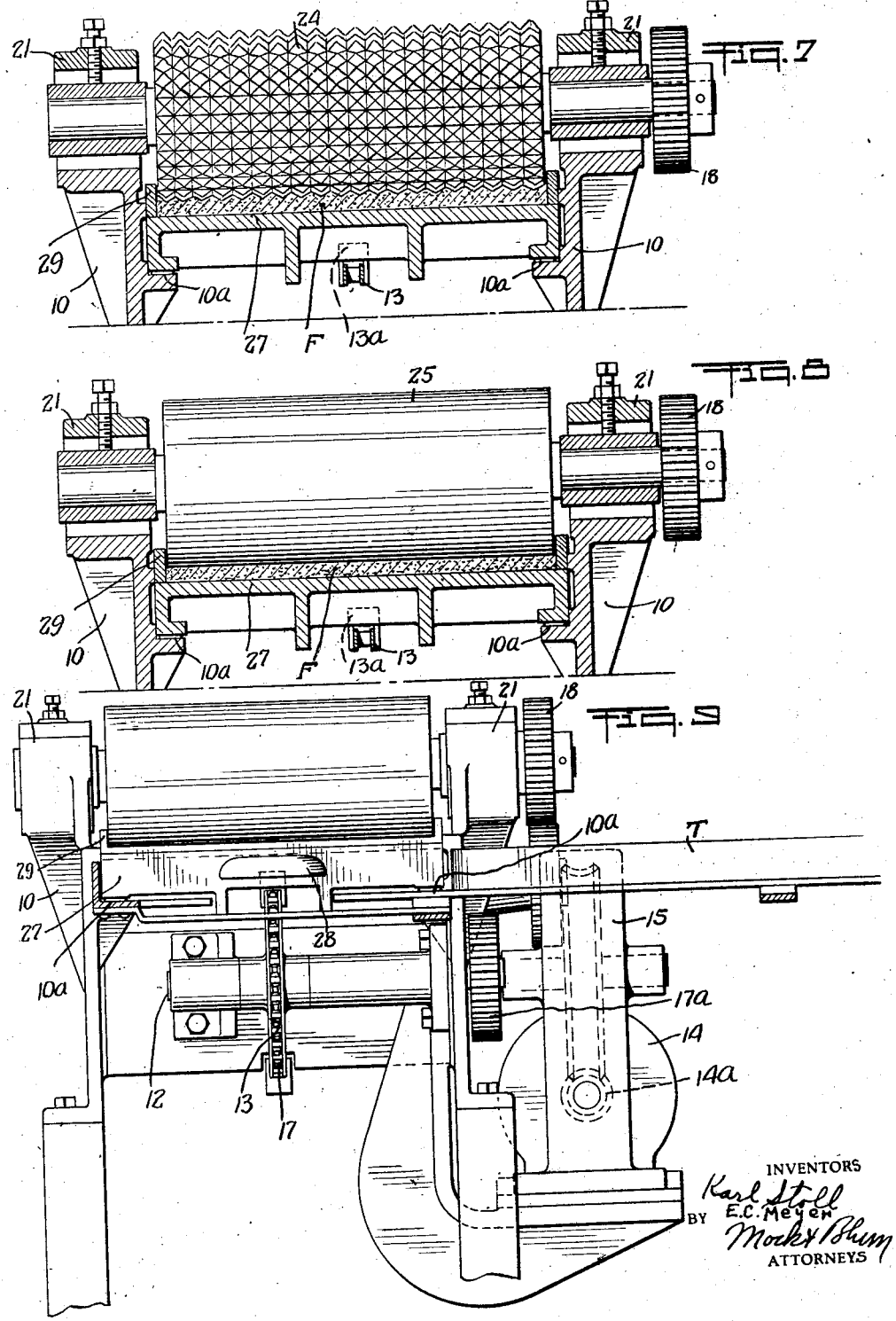

Nov. 1, 1927.
K. STOLL ET AL
1,647,756
METHOD OF SHAPING PLASTIC MATERIAL
Filed Feb. 28, 1927    4 Sheets-Sheet 4
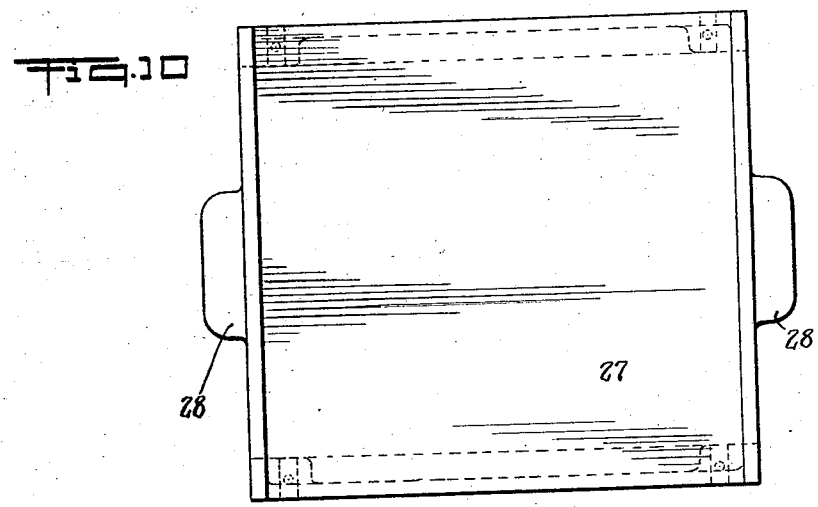
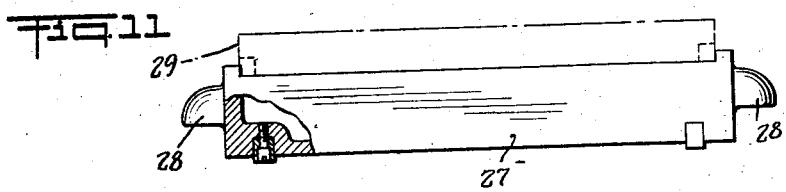
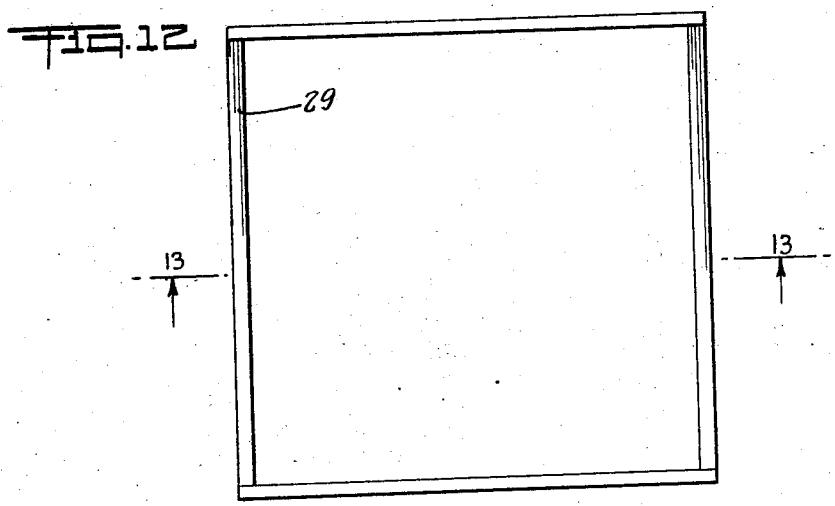
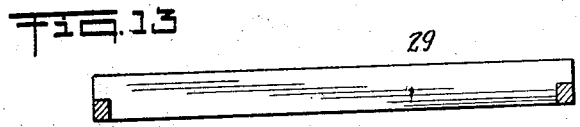
INVENTORS
Karl Stoll
BY E.C. Meyer
Mock & Blum
ATTORNEYS Patented Nov. 1, 1927.

1,647,756

UNITED STATES PATENT OFFICE.

KARL STOLL, OF MAMARONECK, AND ERWIN C. MEYER, OF LARCHMONT, NEW YORK, ASSIGNORS TO PURE FOOD FACTORY "HANSA," OF MAMARONECK, NEW YORK, A CORPORATION OF NEW YORK.

METHOD OF SHAPING PLASTIC MATERIAL.

Application filed February 28, 1927. Serial No. 171,482.

Our invention relates to a new and improved method of forming uniform sheets of bouillon cube material or the like.

One of the objects of our invention is to provide a method of and mechanism for spreading and flattening an irregular mass of the doughy material used for making bouillon cubes and the like into sheets of substantially uniform size and thickness.

Another object of our invention consists in providing an improved mechanism for operating upon this material.

Another object of our invention consists in providing a mechanism whereby an irregular lump or mass of the said material can be placed in a tray and can then be operated upon until it is formed into a sheet of material of substantially uniform thickness and substantially filling the said tray.

Other objects of our invention will be set forth in the following description and drawings which illustrate a preferred embodiment thereof, it being understood that the above general statement of the objects of our invention is intended merely to generally explain the same and not to limit it in any manner.

Fig. 1 is a top view of our improved machine.

Fig. 2 is a side elevation of the machine shown in Fig. 1.

Fig. 3 is a section on the line 3—3 of Fig. 2.

Fig. 4 is a section on the line 4—4 of Fig. 3.

Fig. 5 is a section on the line 5—5 of Fig. 2.

Fig. 6 is a section on the line 6—6 of Fig. 5.

Fig. 7 is a section on the line 7—7 of Fig. 2.

Fig. 8 is a section on the line 8—8 of Fig. 2.

Fig. 9 is a view on the line 9—9 of Fig. 1.

Fig. 10 is a top view showing the tray and the tray holder assembled.

Fig. 11 is a side view of the device shown in Fig. 10, part of the device being shown broken away.

Fig. 12 is a top view of the tray.

Fig. 13 is a sectional view on the line 13—13 of Fig. 12.

Cubes made of beef extract, chicken extract or the like are formed by suitably shaping and cutting a mass of plastic material which is initially made in irregular lumps and which must be formed into sheets of substantially uniform shape and thickness. Such material is difficult to roll and it has been hitherto necessary to roll it by hand in order to shape the material properly for the action of the cutting machines.

This material is much tougher and much more difficult to shape than the ordinary dough used for making bread or the like.

According to our invention, it is possible to place a lump or mass of this material in a tray, and gradually shape the mass of material until it has assumed the same contour as the tray, and is of substantially uniform thickness.

The machine illustrated herein is provided with angular rails T. Each lump or mass F of the plastic material is placed within a tray 29 of substantially square shape, as shown in Figs. 12 and 13. Each tray 29 is placed within a tray holder 27 having ears 28 by means of which it can be manipulated and actuated.

The side walls of the tray holders 27 fit between the rails T which act as guides for the movement of the tray holders. These holders 27 slide on rails 10$^a$ of the frame 10.

The tray holders 27 are moved underneath the rollers later mentioned, by means of a chain 13 which passes over a front sprocket 16 and a rear sprocket 17. A motor 14 of any suitable type operates the shaft 12 by means of the worm 14$^a$ and the reduction gear 15 and other intermediate parts. The shaft of the gear 15 is provided with a gear 15$^a$ which meshes with the gear 17$^a$ mounted upon the shaft 12 of the sprocket 17. The front sprocket 16 is mounted upon a front shaft 11 and this is provided with a gear 19′ which actuates the first or left-hand gear 18, by means of the intermediate gears 18$^a$ and 18$^b$. The respective gears 18 are provided with intermediate idlers 19 so that all the gears 18 together with their intermediate idlers 19 are revolved in unison. Each of the rollers 22, 23, 24, 25 and 26 has its shaft provided with a gear 18. The said rollers are provided with bearings 21 and the idlers 19 are provided with bearings 19a.

In the view shown in Fig. 1, the trays are assumed to move from left to right and each of the rollers has a counterclockwise movement. As shown in Fig. 3, the first roller 22 is provided with equal and transverse teeth or ridges. As shown in Fig. 4, these transverse teeth or ridges each have a triangular cross-section or contour. The said roller 22, like all of the other rollers, is of substantial weight and is prevented from moving upwardly by means of its bearings. Hence, the action of the first roller 22 is to tend to laterally spread out the mass F and to provide it with lateral triangular projections.

The second roller 23 is provided with circumferential teeth of substantially triangular cross-section or contour so that the second roller 23 which also bears upon the mass of plastic material also tends to spread out the plastic mass F, this time in the longitudinal direction. Likewise, the circumferential teeth of the second roller 23 break up the triangular ridges formed by the first roller 22, so that the top of the plastic mass of material now has a series of projections of pyramidal form.

The third roller 24 is provided with pyramidal teeth or projections, which correspond in contour to the pyramidal projections formed upon the top of the plastic mass by means of the first two rollers. The action of the third roller 24 is to additionally flatten out the mass of plastic material and to cause it to spread in all directions.

The last two rollers 25 and 26 are of smooth cylindrical contour, the last roller 26 being mounted so that its bottom projects somewhat below the bottom of the preceding smooth roller 25. Hence, when a tray has passed out of the right-hand side of the machine, the top of the plastic mass will be perfectly smooth or planar and the plastic mass will have been rolled until it has a substantially uniform thickness throughout and until it has completely filled up the tray. The mass of plastic material can now be cut by any suitable machine.

As shown in Fig. 6, the chain 13 is provided with lugs 13a which engage the ears 28 of the tray holders 27 so as to positively actuate them.

It will be noted that while the plastic mass F is subjected to a series of rolling operations, that the periphery of each rolling surface which contacts with the said mass, is moving in the same direction as the said mass and with substantially the same linear velocity. Hence, the mass of plastic material is caused to spread solely by the action of the respective pressures of the various rollers. Of course, this result is only approximate, but since the first three rollers have corrugated surfaces, these corrugated surfaces positively engage the mass of plastic material.

It will also be noted that after the first two rollers have subjected the mass of plastic material to pressure, and have formed corrugations in the surface of the said mass of plastic material which are substantially at right angles to each other, that the third roller subjects the mass of plastic material to pressure at separated points thereof corresponding to the points of the teeth of the said third roller.

We have shown a preferred embodiment of my invention but it is clear that numerous changes and omissions could be made without departing from its spirit.

We claim:—

1. In the art of spreading a mass of plastic material, those steps which consist in subjecting the mass of plastic material to pressure while forming corrugations in the surface thereof, and then again subjecting the said mass to pressure while forming therein second corrugations in said surface which make an angle with the first mentioned corrugations.

2. In the art of spreading a mass of plastic material, those steps which consist in subjecting the mass of plastic material to pressure while forming corrugations in the surface thereof, and then again subjecting the said mass to pressure while forming therein second corrugations in said surface which make substantially a right angle with the first mentioned corrugations.

3. A method of spreading and shaping a mass of plastic material which consists in subjecting it to pressure while forming corrugations in the surface thereof, then subjecting the said mass of material again to pressure, while forming in said surface corrugations making an angle with the first mentioned corrugations, and then again subjecting said surface of the mass of material to pressure at separated points thereof.

4. A method of shaping a mass of plastic material which consists in moving said mass of material while subjecting it to the pressure of a rolling surface having substantially the same linear velocity to form corrugations in the surface of the mass of plastic material, then subjecting the moving mass of plastic material to the pressure of a second rolling surface having substantially the same linear velocity to form corrugations in the surface of said plastic material which make an angle with the first mentioned corrugations, then subjecting the moving mass of plastic material to the pressure of a third rolling surface having substantially the same linear velocity and acting upon said surface mass of plastic material at a series of separated points, and then subjecting the mass of plastic material to additional pressure to smooth the surface thereof.

In testimony whereof we affix our signatures.

KARL STOLL.
ERWIN C. MEYER.